US008155125B1

(12) United States Patent
Borgione et al.

(10) Patent No.: US 8,155,125 B1
(45) Date of Patent: Apr. 10, 2012

(54) APPARATUS AND METHOD FOR UTILIZING AGGREGATE NETWORK LINKS FOR MULTICAST SWITCHING

(75) Inventors: Gaetano Borgione, San Jose, CA (US); Kevin C. Wong, Mountain View, CA (US); David S. Walker, San Jose, CA (US); Chickayya Naik, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2320 days.

(21) Appl. No.: 10/944,307

(22) Filed: Sep. 17, 2004

(51) Int. Cl.
*H04L 12/28* (2006.01)
(52) U.S. Cl. .................. 370/397; 370/395.3; 370/409
(58) Field of Classification Search .............. 370/389, 370/397, 399, 351; 709/245
See application file for complete search history.

(56) References Cited

U.S. PATENT DOCUMENTS

| | | | | |
|---|---|---|---|---|
| 5,436,893 A * | 7/1995 | Barnett | ............ | 370/392 |
| 5,666,360 A * | 9/1997 | Chen et al. | ............ | 370/390 |
| 5,687,324 A * | 11/1997 | Green et al. | ............ | 370/414 |
| 6,016,310 A * | 1/2000 | Muller et al. | ............ | 370/255 |
| 6,169,741 B1 * | 1/2001 | LeMaire et al. | ............ | 370/401 |
| 6,553,029 B1 * | 4/2003 | Alexander | ............ | 370/389 |
| 6,577,631 B1 * | 6/2003 | Keenan et al. | ............ | 370/394 |
| 6,625,151 B1 * | 9/2003 | Alowersson et al. | ............ | 370/390 |
| 6,647,428 B1 * | 11/2003 | Bannai et al. | ............ | 709/245 |
| 6,650,621 B1 * | 11/2003 | Maki-Kullas | ............ | 370/238 |
| 6,678,242 B1 * | 1/2004 | Simon | ............ | 370/218 |
| 6,768,871 B2 * | 7/2004 | Chang et al. | ............ | 398/51 |
| 6,973,082 B2 * | 12/2005 | Devi et al. | ............ | 370/390 |
| 7,130,303 B2 * | 10/2006 | Hadzic | ............ | 370/389 |
| 7,376,745 B2 * | 5/2008 | Shitano et al. | ............ | 709/229 |
| 2002/0176450 A1 * | 11/2002 | Kong et al. | ............ | 370/539 |
| 2003/0012202 A1 * | 1/2003 | Fukutomi | ............ | 370/395.52 |
| 2003/0123453 A1 * | 7/2003 | Ooghe et al. | ............ | 370/395.53 |
| 2003/0165140 A1 * | 9/2003 | Tang et al. | ............ | 370/393 |
| 2004/0076162 A1 * | 4/2004 | Lee et al. | ............ | 370/395.52 |
| 2004/0221042 A1 * | 11/2004 | Meier | ............ | 709/227 |
| 2004/0258003 A1 * | 12/2004 | Kokot et al. | ............ | 370/254 |
| 2005/0190775 A1 * | 9/2005 | Tonnby et al. | ............ | 370/401 |
| 2005/0213582 A1 * | 9/2005 | Wakumoto et al. | ............ | 370/395.3 |
| 2006/0002370 A1 * | 1/2006 | Rabie et al. | ............ | 370/351 |
| 2006/0039364 A1 * | 2/2006 | Wright | ............ | 370/352 |
| 2006/0251085 A1 * | 11/2006 | Kalkunte et al. | ............ | 370/400 |

* cited by examiner

*Primary Examiner* — Hassan Kizou
*Assistant Examiner* — Roberta A Shand
(74) *Attorney, Agent, or Firm* — Campbell Stephenson LLP

(57) ABSTRACT

A method, system, and apparatus to transmit replicated multicast packets over a plurality of physical network links that are combined into one logical channel or link so that the replicated multicast packets are distributed over more than one network link is disclosed. It is further disclosed that distribution over the network links is accomplished, in part, through analyzing the multicast packet for information other than ethernet addresses. Such information can include a tag header including destination interface information.

58 Claims, 4 Drawing Sheets

APPARATUS AND METHOD FOR UTILIZING AGGREGATE NETWORK LINKS FOR MULTICAST SWITCHING

FIELD OF THE INVENTION

This invention relates to the field of information networks, and more particularly relates to transmitting multicast data packets across an aggregate of network connections between network nodes.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. To meet such demands, aggregation of network links into a single logical link between nodes (such as switches, routers or bridges connecting physically remote local area networks) that share a high amount of traffic so as to increase the effective data transmission bandwidth between nodes has become popular. Also, logical distribution of nodes in a network into subnetworks containing nodes that exchange a substantial amount of traffic has become popular. These methods provide high bandwidth, capacity for future growth, and facilitate network load distribution.

FIG. 1 is a block diagram showing a topology of a network. Network nodes 130(1)-(M) are connected to a link node 110. Link node 110 may, for example, be a switch, bridge, router, or a hub. The connections between nodes 130(1)-(M) and link node 110 permit the nodes to share data. Nodes 130(1)-(M) may be any kind of network node, including, for example, computer workstations, storage area network (SAN) controllers, tape controllers, mainframe computer systems, router, switches and additional link nodes. Link node 110 is connected to a link node 120 through a plurality of network links 150. Link node 120 may also be, for example, a switch, bridge, router, or a hub. Link node 120 is further connected to a plurality of network nodes 140(1)-(N). Nodes 130(1)-(M) and 140(1)-(N) form local area networks (LANs) connected to their associated link nodes 110 and 120.

Variable identifiers "M" and "N" are used in several instances in FIG. 1 to more simply designate the final element of a series of related or similar elements. Repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "M" or "N" may hold the same or a different value than other instances of the same variable identifier.

Link nodes 110 and 120 can be in physically remote locations, thereby connecting their associated local area networks (LANs). The plurality of network links 150 between link nodes 110 and 120 can be aggregated as a single logical link over which all traffic between link nodes 110 and 120 is distributed. Such aggregation multiplies the available bandwidth for communications between link nodes 110 and 120, and therefore between the two local area networks. When appropriately configured, such a connection can permit the two local area networks to interact as if they were one large local area network.

As stated above, the plurality of network links between 110 and 120 can be aggregated as a single logical link. In this manner, each link node 110 and 120 sees the plurality of network links between them as one logical interface. One type of such an aggregate of links is an EtherChannel, a protocol that allows up to eight Fast Ethernet or Gigabit Ethernet links to be aggregated. Routing protocols treat the aggregated links as a single, routed interface with a common IP address.

Load balancing of data packets transmitted across individual network links within an aggregate of network links can be handled by interface hardware. The individual network links, across which the data load is to be balanced, can be selected in several ways. One such way is to analyze source and destination Ethernet addresses within the data packets to be sent over the logical link and generate a link identifier from that information. Another method for selecting a network link over which to send a packet is a round robin method, wherein each link is selected in order as packets arrive.

Another method for increasing the data transmission bandwidth in a network such as that shown in FIG. 1 is to logically subdivide the network using virtual local area networks (VLANs). VLANs can be viewed as a group of network nodes on different physical LAN segments. The group of network nodes can communicate with each other as if they were all on the same physical LAN segment. Typically, network switches are used to divide the network into VLANs. A VLAN can be envisioned as a workgroup, that is a group of network nodes that share resources (i.e., SANs or backup devices) or otherwise communicate often. VLAN nodes can be logically grouped into a single broadcast domain. By their nature, VLANs have separate broadcast domains. Broadcast traffic can be limited to just those nodes in the VLAN grouping, thereby reducing traffic seen by the rest of the network.

Further, VLANs can be independent of the physical location of each VLAN member network node. Network nodes anywhere in a network can be logically grouped into a VLAN.

VLAN benefits include increased available network data transmission bandwidth and physical topology independence. Grouping network nodes into VLANs increases available network transmission bandwidth by limiting broadcast traffic to network nodes of the VLAN. Additionally, since VLANs are typically implemented by VLAN-capable switches, less traffic needs to be routed and therefore router latency can be reduced. Further, VLANs allow LAN administrators to "fine tune" a network by logically grouping network nodes. VLANs also provide independence from the physical topology of the network by allowing location diverse network nodes to be logically connected within a single broadcast domain.

FIG. 1 illustrates how physically separated nodes can be part of the same VLAN. For example, network nodes 130(3) and 130(4) are part of the same VLAN 160(1) as network nodes 140(1) and 140(2). In order to support such a configuration, link nodes 110 and 120 need to be VLAN capable.

VLAN tag headers are included in the header of Open System Interconnection (OSI) Level 2 Ethernet packets to enable communication between or within a VLAN. The VLAN tag header is described in IEEE Std. 802.1Q. VLAN tag headers carry a VLAN identification (VID). The VID is a 12-bit field that uniquely identifies the VLAN to which a packet belongs. The VLAN tag header can be inserted immediately following destination and source MAC address fields of an Ethernet packet.

A network such as that illustrated in FIG. 1 should be capable of handling different types of packet transmission, including unicast, broadcast, and multicast packet transmission.

Unicast packet communication takes place over a network between a single sender network node and a single receiver network node. A unicast Ethernet packet will contain a source Ethernet address and a destination Ethernet address within a MAC header, as shown in FIGS. 2 and 3.

Broadcast packets originate at a single source network node but are destined for every node on a network or subnetwork. The source address of a broadcast packet is that of the originating network node, but the destination address is a special broadcast address. As stated above, VLANs can serve to limit the number of nodes receiving a broadcast packet to nodes in the VLAN, if so desired.

A multicast packet is typically transmitted as a single packet received by a select group of receivers. The group of receivers is designated by a multicast address. The source node address appears in the header of a multicast packet, and the multicast address appears as the destination address. A single multicast packet sent by a network node can be replicated at other network nodes, such as link nodes 110 and 120, in order for the receivers to receiver the multicast packet. Each replicated multicast packet will have the same source and destination address (the multicast address).

FIGS. 4 and 5 illustrate the translation of an OSI Level 3 multicast IP address to an OSI Level 2 multicast Ethernet address. The OSI Level 3 multicast IP address is a 28-bit group identification, the low-order 23 bits of which is copied to a 48-bit OSI Level 2 multicast Ethernet address.

As stated above, packet source and destination addresses can be analyzed to determine which network link in a logical link is to be used to send a packet between link nodes 110 and 120. Commonly, such analysis involves a hashing algorithm that takes the Ethernet addresses and generates a network link identifier. The network link identifier identifies which of the plurality of network links is to be used for sending the packet between link nodes 110 and 120.

While the aforementioned method addresses data load balancing for certain types of data transmission (e.g., unicast), the method does not efficiently balance data loads across individual network links within a logical link for more complex data transmission such as multicast packet transmission. To illustrate, if a multicast packet is replicated at a link node (e.g., link node 110 or 120), the source and destination address are the same for replicated multicast packets, and such a hashing algorithm will generate the same link identifier for each replicated multicast packet and therefore send all of those replicated multicast packets on the same network link. This can create an undesirable load imbalance among the plurality of network links.

Since replicated multicast packets have the same source and destination Ethernet addresses, all replicated multicast packets being transmitted on a logical link will be transmitted on the same network link. It is therefore desirable to have a method or apparatus that is capable of distributing multicast Ethernet packets among the plurality of network links comprising a logical link.

SUMMARY OF THE INVENTION

The present invention presents a method, system, and apparatus to transmit replicated multicast packets over a plurality of physical network links that are combined into one logical channel or link so that the replicated multicast packets are distributed over more than one network link. This is accomplished, in part, through analyzing the multicast packet for information other than Ethernet addresses. Such information can include a tag header including destination interface information (for example, a VLAN identification field in an IEEE Std. 802.1Q packet header tag).

Accordingly, one aspect of the present invention provides a method for transmitting a replicated multicast packet over one of a plurality of network links that form one logical channel. Selecting the one of the plurality of network links comprises analyzing a destination ethernet address of the replicated multicast packet and a non-ethernet component of the header of the replicated multicast packet.

A further aspect of the present invention provides a method for replicating a multicast packet to produce first and second multicast packets, which are transmitted over a first and second link of a logical channel between a pair of network nodes.

Another aspect of the present invention provides a system comprising a first network node coupled to a second network node through a plurality of network links. The first network node selects a destination interface identifier for an outgoing multicast packet, selects one of the plurality of network links using the destination interface identifier, and transmits the outgoing multicast packet to the second network node over the selected network link.

Another aspect of the present invention provides a method comprising connecting a first network device to a second network device using a plurality of network links. A multicast packet is provided to the first network device, which is configured to replicate the multicast packet thus forming replicated multicast packets. Each replicated multicast packet receives a destination interface identifier which is used to select one of the plurality of network links for transmitting the replicated multicast packet by the first network device.

A further aspect of the present invention provides an apparatus comprising a means for transmitting a replicated multicast packet over one of a plurality of network links that form one logical channel. The apparatus further comprises a means for selecting one of the network links that includes a means for analyzing a destination address of the replicated multicast packet and a non-ethernet address component of the header of the replicated multicast packet.

Another aspect of the present invention provides an apparatus comprising a means for replicating a multicast packet to produce first and second multicast packets, and a means for transmitting the first and second multicast packets over first and second links of a logical channel between a pair of network nodes.

A further aspect of the present invention provides an apparatus comprising a processor, network interfaces coupled to a plurality of network links configured to form a logical channel, and a memory storing instructions that upon execution cause the processor to transmit a replicated multicast packet over one of the plurality of network links, and to select one of the plurality of network links by analyzing a destination ethernet address of the replicated multicast packet and a non-ethernet address component of a header of the replicated multicast packet.

Another aspect of the present invention provides a computer program product comprising signal bearing media bearing programming adapted to transmit a replicated multicast packet over one of a plurality of network links that form a logical channel, and to select one of the plurality of network links by analyzing a destination ethernet address of the replicated multicast packet and a non-ethernet address component of a header of the replicated multicast packet.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, feature, and advantages made apparent to those skilled in the art by referencing the accompanying drawings.

DETAILED DESCRIPTION

The present invention balances the transmission of replicated multicast packets among an aggregate of network links that provide a logical channel or link between network nodes. Prior art link load balancing requires analysis of source and destination Ethernet addresses (i.e., as input to a hashing algorithm). Since replicated multicast packets each have the same source and destination Ethernet addresses, another part of a replicated multicast Ethernet packet must be used in order to differentiate between replicated multicast Ethernet packets. An added tag header can be used to include a destination interface identifier. For example, in a VLAN network environment, such a tag header is included in packets per IEEE Std. 802.1Q. A portion of an IEEE Std. 802.1Q tag header is a VLAN identifier (VID), which is unique to a particular VLAN. A destination interface identifier within a tag header can be used to select which network link in a logical link is to be used to transmit a replicated multicast packet. Since the destination interface identifier often varies from replicated multicast packet to replicated multicast packet, use of the destination interface identifier to select a network link will lead to a more even distribution of multicast packet transmission across the logical link. Such a distribution can reduce the likelihood of a load imbalance in the logical link.

Network packets contain header information and data payload information. Header information can include Media Access Control (MAC) addressing such as the source and destination addresses of the packet.

Figure 2:
FIG. 2 is a block diagram illustrating an Ethernet packet with a tag header.

FIG. 2 illustrates an exemplary MAC Ethernet packet header and data payload. FIG. 2 also illustrates a tag header (for example, a VLAN tag header) that is part of the packet header.

Figure 3:
FIG. 3 is a block diagram illustrating a Media Access Control (MAC) header.

FIG. 3 shows a breakdown of the MAC Ethernet packet header including source and destination addresses. For any packet, the source address is a unique number determined by the hardware of the source network node. Generally, a destination address is resolved from an OSI Level 3 network address to an OSI Level 2 address (i.e., through table lookups).

Figure 4:
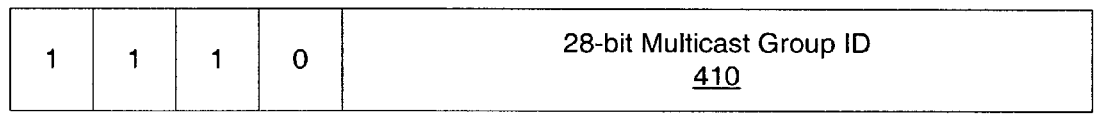
FIG. 4 is a block diagram illustrating an OSI Level 3 multicast IP address.
Figure 5:
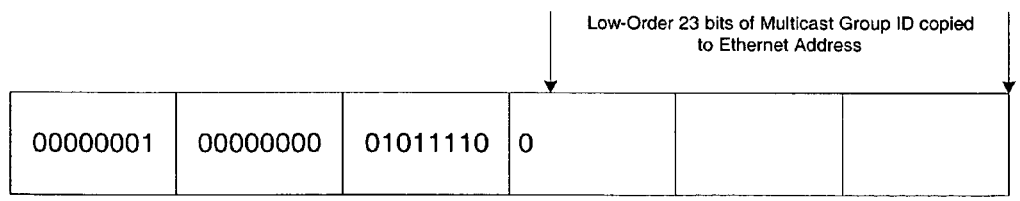
FIG. 5 is a block diagram illustrating an OSI Level 2 48-bit multicast Ethernet address.

Multicast packets generally do not have a single network node destination. Rather, a multicast packet is destined for a group of subscribing receiver nodes. FIG. 4 illustrates relevant portions of an internet protocol (IP) OSI Level 3 multicast address. Such an address can include a 28-bit multicast group identification preceded by a prefix. The multicast group ID identifies the group of receivers to receive a copy of the multicast packet. In deriving an OSI Level 2 address from an OSI Level 3 address, a portion of the Level 3 address can be copied to the Level 2 address. For an example, a multicast IP address can be used to generate a 48-bit Ethernet multicast address by copying the lower 23 bits of the IP multicast group identification to the Ethernet address and preceding those bits by a multicast prefix, as shown in FIG. 3.

Upon receipt of a packet including a multicast destination address, a linking node can identify the network nodes subscribing to the multicast group and replicate the multicast packets. The replicated multicast packets can then be forwarded to the identified network nodes. Each replicated multicast packet will have the same source and destination addresses in the MAC header.

Under IEEE Std. 802.1Q, an additional piece of information can be inserted into a MAC header as a tag header. This tag header includes the VID of destination network nodes. Under the standard, the VID is a 12-bit field that uniquely identifies the VLAN to which the packet is destined. Therefore, each replicated multicast packet destined for network nodes on different VLANs will have a different VID.

VLAN-enabled link nodes (such as switches or bridges) insert the destination VID. In the case of replicated multicast packets, the destination VID can be determined through the use of a lookup table (i.e., a "multicast expansion table").

Figure 1:
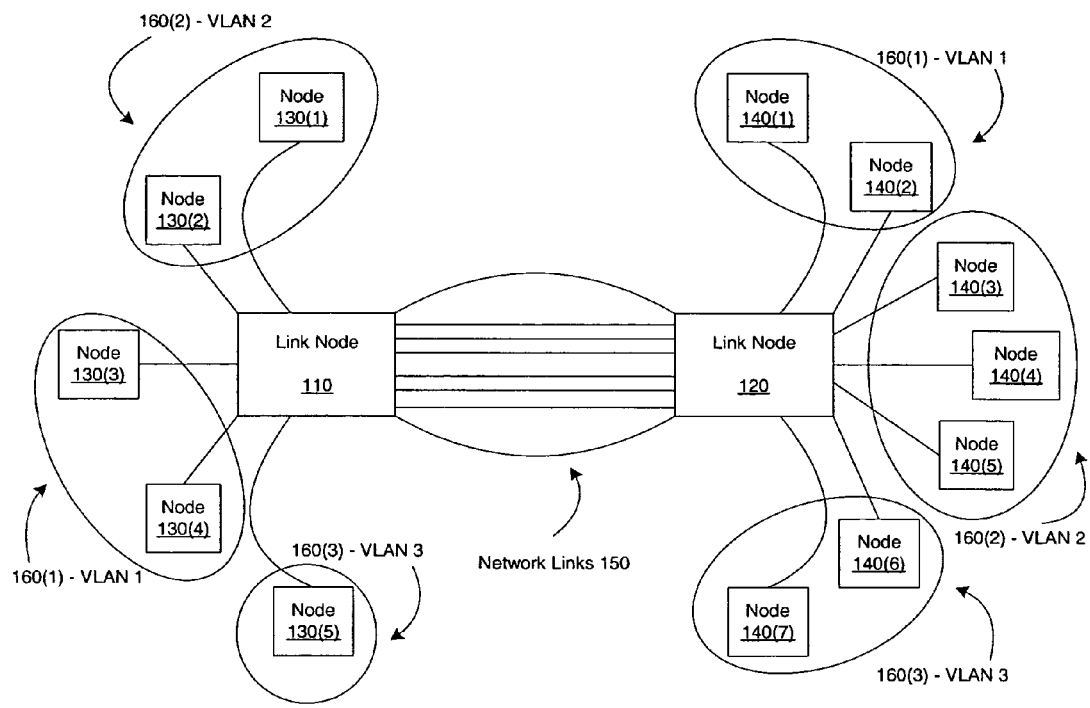
FIG. 1 is a block diagram illustrating a network topology including VLANs.
Figure 6:
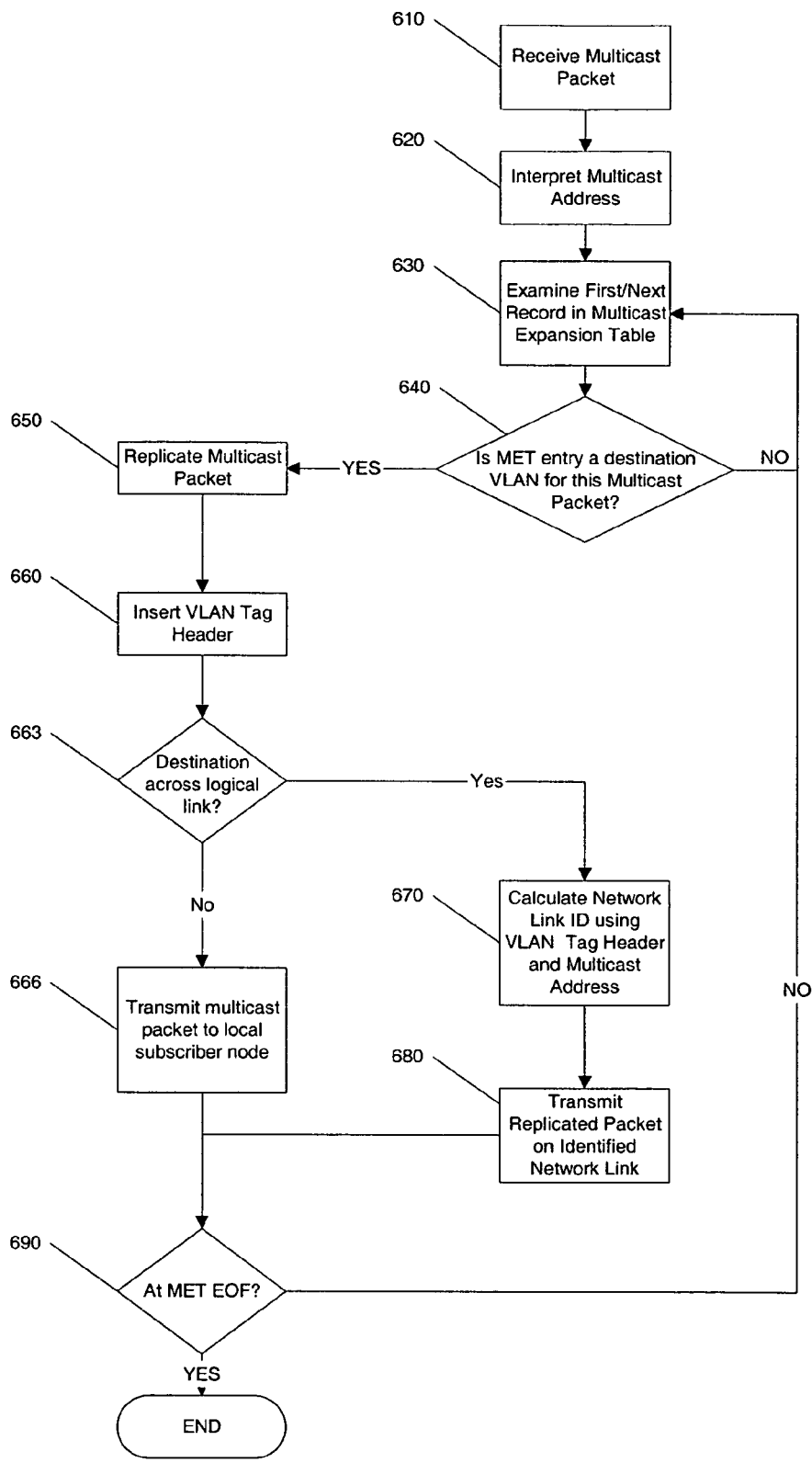
FIG. 6 is a flowchart of actions taken in accordance with one embodiment of the present invention.

FIG. 6 is a flowchart of steps to distribute transmission of replicated multicast Ethernet packets across network links of a logical link between network nodes (such as link nodes 110 and 120 of FIG. 1) in a network configured with VLANs. A link node receives network traffic from other locally connected network nodes. Upon receipt of a multicast packet (610), the link node can examine the packet's destination address in order to determine whether the packet is a unicast, broadcast, or multicast packet (620). For multicast packets, the link node then can determine the VLAN location of receivers of the multicast packet using a table of multicast receivers (i.e., a multicast expansion table) corresponding to the multicast group ID of the multicast packet (630). Each entry in the table can be reviewed to determine whether the entry describes a VLAN of a receiver for the multicast packet (640). For each destination VLAN, the link node can replicate the multicast packet (650) and insert a tag header (i.e., 220 in FIG. 2) that contains the respective destination interface identifier (i.e., a VID) (660).

Once a replicated multicast packet containing a tag header is generated, the link node can determine whether a receiving node in a VLAN identified in the replicated multicast packet is local to the link node or across the logical link (i.e., local to node 110 or local to node 120 in FIG. 1) (663). Should the receiving node be local to the link node, the multicast packet is transmitted on the local portion of the VLAN to the local receiver node (666). Should the receiver node be located across the logical link, then the link node calculates a network link identifier corresponding to a network link within the logical link (670). In order to distribute the replicated multicast packets across the network links, the network link identifier can be generated by analyzing the VID portion of the tag header, as well as the source and destination addresses. While the VID will be the same for all receiver nodes on a particular VLAN, the VID will differentiate between nodes that are on different VLANs.

A calculation that takes place in step 670 can take any form that generates an output value from an input value. A hash algorithm is one form of such a function. A hash function can have as an input a destination interface identifier (such as VID).

Once a network link identifier has been calculated, the replicated multicast packet can then be transmitted on the identified network link (680). The link node can then determine whether the end of the multicast expansion table has been reached, and if not then examine the next record in the table and continue to associate VIDs with the multicast address.

A receiving link node (i.e., 120 in FIG. 1) can examine the replicated multicast packet and determine whether the receiver node is local to the receiving link node and if so transmit the replicated multicast packet to the receiver node. Otherwise, the receiving link node can relay the replicated multicast packet to another network link node to which the receiver node may be local.

Various processes according to embodiments of the present invention are discussed herein. Operations discussed herein may consist of directly entered commands by a computer system user or by steps executed by software modules, but the preferred embodiment includes steps executed by application specific hardware modules. The functionality of steps referred to herein may correspond to the functionality of modules or portions of modules.

These operations may be modules or portions of modules (e.g., software, firmware or hardware modules). For example, although the described embodiment includes application specific hardware modules, the various example modules may be software modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

The software modules described herein may be received by a computer system, for example, from a computer-readable medium. The computer-readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Although the examples described typically illustrate conventional application software, other examples might include web-based applications. In general, any type of software implementation suitable for client/server computing environment can be used to implement the present invention.

Figure 7:
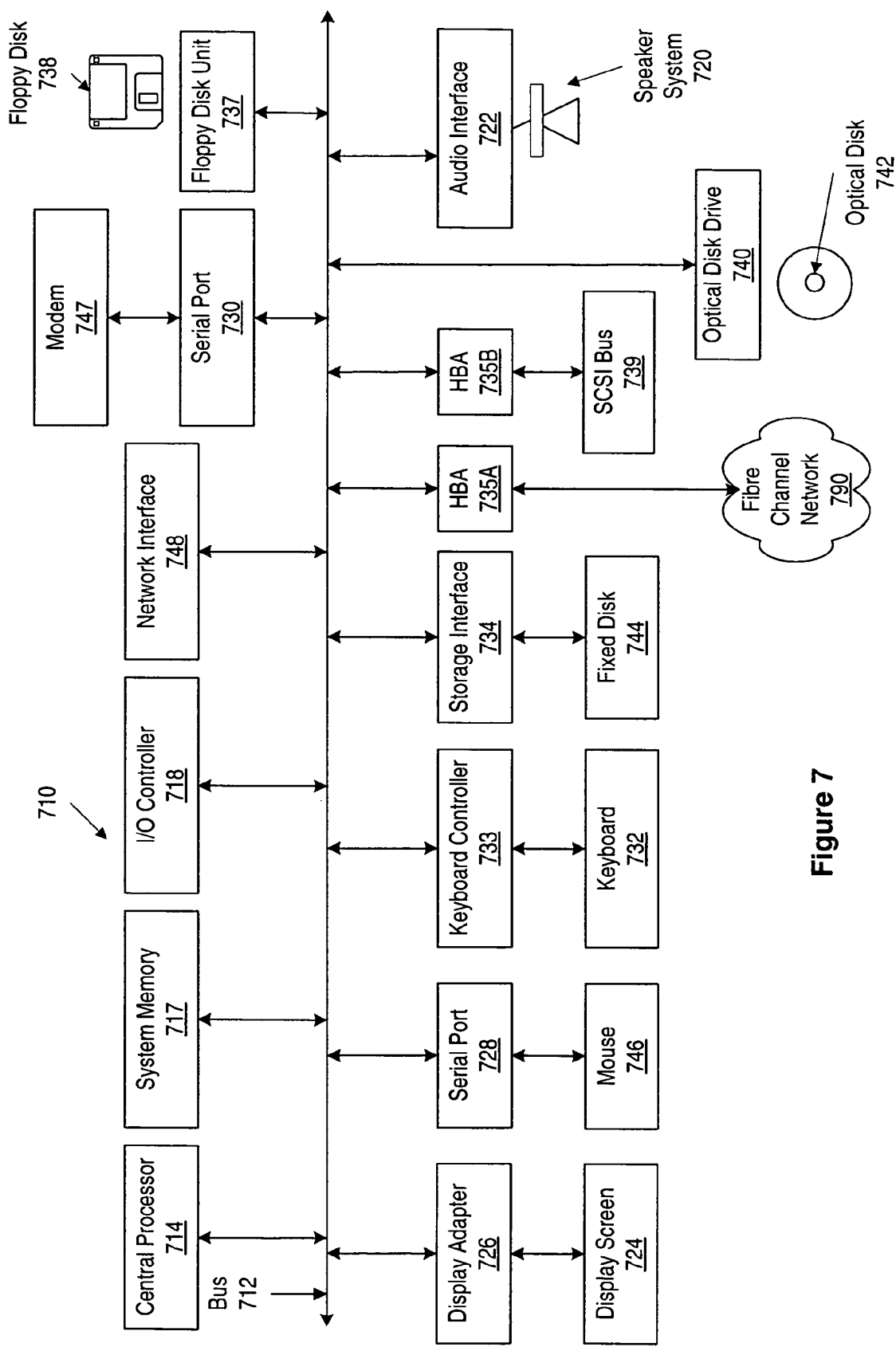
FIG. 7 illustrates a block diagram of a computer system 700 for implementing the techniques of the present invention.

FIG. 7 illustrates a block diagram of a computer system 700 for implementing the techniques of the present invention. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., software 723, 725, 727, and 729. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, computer languages such as C, C++, C#, and Java. If implemented in a web-based client/server environment, computer languages such as HTML, XML, JavaScript, VBScript, JScript, PHP, Perl; development environments/tools such as Active Server Pages (ASP), JavaServer Pages (JSP), and ColdFusion; and interface tools such as the Common Gateway Interface (CGI) can also be used. Additionally, software 723, 725, 727, and 729 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fibre channel interface.

While particular embodiments of the present invention have been shown and described, it will be apparent to those skilled in the art that, based upon the teachings herein, changes and modifications may be made without departing from this invention and its broader aspects and, therefore, the appended claims are to encompass within their scope all such changes and modifications as are within the true scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A method comprising:
   inserting a non-ethernet address component into a header of a replicated multicast packet;
   selecting one of a plurality of network links, wherein
      the plurality of network links form one logical channel, and
      the selecting comprises analyzing a destination ethernet address of the replicated multicast packet and the non-ethernet address component of the header of the replicated multicast packet;

generating a link identifier, wherein
  the link identifier depends upon the destination ethernet address and the non-ethernet address component of the replicated multicast packet, and
  the link identifier identifies the one of the plurality of network links; and
transmitting the replicated multicast packet over the one of the plurality of network links.

2. The method of claim 1, wherein the non-ethernet address component of the replicated multicast packet is comprised of:
a destination interface identifier.

3. The method of claim 2, wherein the destination interface identifier is a VLAN identifier.

4. The method of claim 2, further comprising:
replicating a received multicast packet forming a plurality of replicated multicast packets; and
inserting a destination interface identifier into each replicated multicast packet, wherein
  the each replicated multicast packet receives a different destination interface identifier.

5. The method of claim 4, wherein a quantity of different destination interface identifiers is dependent upon a number of network locations of destinations for the received multicast packet.

6. The method of claim 5, wherein a quantity of replicated multicast packets is substantially the same as the quantity of different destination interface identifiers.

7. The method of claim 2, wherein the generating comprises a hash function.

8. The method of claim 1, wherein the one logical channel is an EtherChannel.

9. A method comprising:
replicating a multicast packet to produce first and second replicated multicast packets;
inserting a non-ethernet address component into a header of the first and second replicated multicast packets;
selecting a first and second link of a logical channel between a pair of network nodes, wherein
  the selecting comprises generating a first and second link identifier dependent upon a destination ethernet address of the first and second replicated multicast packets, respectively, and the non-ethernet address component of the first and second replicated multicast packets, respectively, and
  the first and second link identifiers identify the first and second links, respectively; and
transmitting the first and second replicated multicast packets over the first and second links.

10. The method of claim 9, wherein the non-ethernet address component is dependent upon a network location of a final destination network node of the first and second replicated multicast packets.

11. The method of claim 10, wherein the non-ethernet address component is a VLAN identifier.

12. The method of claim 10, wherein the generating the first and second link identifiers comprises a hash function.

13. A system comprising:
a first network node coupled to a second network node through a plurality of network links forming one logical channel, wherein the first network node inserts a non-ethernet address component into a header of an outgoing multicast packet,
  selects one of the plurality of network links by analyzing a destination ethernet address component of the outgoing multicast packet and the non-ethernet address component in the header of the outgoing multicast packet,
  generates a link identifier, wherein
    the link identifier depends upon the destination ethernet address component and the non-ethernet address component of the outgoing multicast packet, and
    the link identifier identifies the one of the plurality of network links, and
  transmits the outgoing multicast packet to the second network node over the one of the plurality of network links.

14. The system of claim 13, wherein the non-ethernet address component is a VLAN identifier.

15. The system of claim 13, wherein the first network node receives a received multicast packet,
replicates the received multicast packet forming a plurality of replicated multicast packets, wherein
  each of the replicated multicast packets receives a unique non-ethernet address component, and
transmits each of the replicated multicast packets over a respective network link of the plurality of network links.

16. The system of claim 15, wherein
the unique non-ethernet address component depends upon a network location of any destination of the received multicast packet.

17. The system of claim 13, wherein the one logical channel is an EtherChannel.

18. The system of claim 13, wherein the first network node generates the link identifier using a hash function.

19. The system of claim 13, wherein the first network node is one of a router, a switch, and a hub.

20. A method comprising:
connecting a first network device to a second network device using a plurality of aggregated network links, wherein
  the plurality of aggregated network links form one logical channel;
providing a multicast packet to the first network device;
configuring the first network device to replicate the multicast packet forming replicated multicast packets, wherein
  each replicated multicast packet receives a non-ethernet address component;
configuring the first network device to generate a link identifier for the each replicated multicast packet, wherein
  the link identifier for the each replicated multicast packet depends upon an ethernet address component and the non-ethernet address component of the each replicated multicast packet, and
  the link identifier identifies one of the plurality of aggregated network links; and
configuring the first network device to transmit the each replicated multicast packet on the one of the plurality of aggregated network links, wherein
  the one of the plurality of aggregated network links is selected using the non-ethernet address component for the each replicated multicast packet.

21. The method of claim 20, further comprising:
providing the multicast packet to the first network device from a third network device, wherein
  the third network device is coupled to the first network device using a network link; and
providing a software application on the third network device, wherein
  the software application generates multicast packets.

22. The method of claim 21, wherein the software application is a multimedia application.

23. An apparatus comprising:
means for inserting a non-ethernet address component into a header of a replicated multicast packet;
means for selecting one of a plurality of network links, wherein
the plurality of network links form one logical channel, and
the means for selecting comprises means for analyzing a destination ethernet address of the replicated multicast packet and the non-ethernet address component of the header of the replicated multicast packet;
means for generating a link identifier, wherein
the link identifier depends upon the destination ethernet address and the non-ethernet address component of the replicated multicast packet, and
the link identifier identifies the one of the plurality of network links; and
means for transmitting the replicated multicast packet over the one of a plurality of network links.

24. The apparatus of claim 23, wherein the non-ethernet address component of the replicated multicast packet comprises:
a destination interface identifier.

25. The apparatus of claim 24, wherein the destination interface identifier comprises a VLAN identifier.

26. The apparatus of claim 24, further comprising:
means for replicating a received multicast packet forming a plurality of replicated multicast packets; and
means for inserting a destination interface identifier into each replicated multicast packet, wherein
the each replicated multicast packet receives a different destination interface identifier.

27. The apparatus of claim 26, wherein a quantity of different destination interface identifiers is dependent upon a number of network locations of destinations for the received multicast packet.

28. The apparatus of claim 27, wherein a quantity of replicated multicast packets is substantially the same as the quantity of different destination interface identifiers.

29. The apparatus of claim 24, wherein the means for generating a link identifier comprises:
a hash function.

30. The apparatus of claim 23, wherein the one logical channel comprises an EtherChannel.

31. An apparatus comprising:
means for replicating a multicast packet to produce first and second replicated multicast packets;
means for inserting a non-ethernet address component into a header of the first and second replicated multicast packets;
means for selecting a first and second link of a logical channel between a pair of network nodes, wherein
the means for selecting comprises means for generating a first and second link identifier dependent upon a destination ethernet address of the first and second replicated multicast packets, respectively, and the non-ethernet address component of the first and second replicated multicast packets, respectively, and
the first and second link identifiers identify the first and second links, respectively; and
means for transmitting the first and second replicated multicast packets over the first and second links.

32. The apparatus of claim 31, wherein
the non-ethernet address component is dependent upon a network location of a final destination network node of the first and second replicated multicast packets.

33. The apparatus of claim 32, wherein the non-ethernet address component comprises a VLAN identifier.

34. The apparatus of claim 32, wherein the means for generating a link identifier comprises:
a hash function.

35. A non-transitory computer readable storage medium storing executable program instructions, wherein, when executed, the executable program instructions are configured to:
insert a non-ethernet address component into a header of a replicated multicast packet;
select one of the plurality of network links by analyzing a destination ethernet address of the replicated multicast packet and the non-ethernet address component of the header of the replicated multicast packet, wherein
the plurality of network links form one logical channel;
generate a link identifier, wherein
the link identifier depends upon the destination ethernet address and the non-ethernet address component of the replicated multicast packet, and
the link identifier identifies the one of the plurality of network links; and
transmit the replicated multicast packet over the one of a plurality of network links.

36. The non-transitory computer readable storage medium of claim 35, wherein the non-ethernet address component of the replicated multicast packet is comprised of:
a destination interface identifier.

37. The non-transitory computer readable storage medium of claim 36, wherein the destination interface identifier is a VLAN identifier.

38. The non-transitory computer readable storage medium of claim 36 further storing executable instructions configured to:
replicate a received multicast packet to form a plurality of replicated multicast packets; and
insert a destination interface identifier into each replicated multicast packet, wherein
the each replicated multicast packet receives a different destination interface identifier.

39. The non-transitory computer readable storage medium of claim 38, wherein a quantity of different destination interface identifiers is dependent upon a number of network locations of destinations for the received multicast packet.

40. The non-transitory computer readable storage medium of claim 39, wherein a quantity of replicated multicast packets is substantially the same as the quantity of different destination interface identifiers.

41. The non-transitory computer readable storage medium of claim 36 further storing executable instructions configured to:
perform a hash function.

42. The non-transitory computer program product of claim 35, wherein the one logical channel is an EtherChannel.

43. A non-transitory computer readable storage medium storing executable program instructions, wherein, when executed, the executable program instructions are configured to:
replicate a multicast packet to produce first and second replicated multicast packets;
insert a non-ethernet address component into a header of the first and second replicated multicast packets;
select a first and second link of a logical channel between a pair of network nodes, wherein
the selecting comprises generating a first and second link identifier dependent upon a destination ethernet address of the first and second replicated multicast packets, respectively, and the non-ethernet address component of the first and second replicated multicast packets, respectively, and the first and second link identifiers identify the first and second links, respectively; and transmit the first and second replicated multicast packets over the first and second links.

44. The non-transitory computer readable storage medium of claim 43, wherein the non-ethernet address component is dependent upon a network location of a final destination network node of the first and second replicated multicast packets.

45. The non-transitory computer readable storage medium of claim 44, wherein the non-ethernet address component is a VLAN identifier.

46. The non-transitory computer readable storage medium of claim 43, wherein the generating the first and second link identifiers comprises:

performing a hash function.

47. A network device comprising:

a processor;

one or more network interfaces coupled to a plurality of network links, wherein the plurality of network links form one logical channel;

a memory, wherein the memory stores instructions that, upon execution by the processor, cause the processor to insert a non-ethernet address component into a header of a replicated multicast packet;

select one of the plurality of network links by analyzing a destination ethernet address of the replicated multicast packet and the non-ethernet address component of the header of the replicated multicast packet;

generate a link identifier, wherein the link identifier depends upon the destination ethernet address and the non-ethernet address component of the replicated multicast packet, and the link identifier identifies the one of the plurality of network links; and transmit the replicated multicast packet over the one of the plurality of network links.

48. The network device of claim 47, wherein the non-ethernet address component of the replicated multicast packet is comprised of:

a destination interface identifier.

49. The network device of claim 48, wherein the destination interface identifier is a VLAN identifier.

50. The network device of claim 48, wherein the instructions further cause the processor to replicate a received multicast packet to form a plurality of replicated multicast packets; and insert a destination interface identifier into each replicated multicast packet, wherein the each replicated multicast packet receives a different destination interface identifier.

51. The network device of claim 50, wherein a quantity of different destination interface identifiers is dependent upon a number of network locations of destinations for the received multicast packet.

52. The network device of claim 51, wherein a quantity of replicated multicast packets is substantially the same as the quantity of different destination interface identifiers.

53. The network device of claim 48, wherein the instructions further cause the processor to generate the link identifier by performing a hash function.

54. The network device of claim 47, wherein the one logical channel is an EtherChannel.

55. A network device comprising:

a processor;

one or more network interfaces coupled to a plurality of network links, wherein the plurality of network links form a logical channel coupling the network device to a remote network device;

a memory, wherein the memory stores instructions that, upon execution by the processor, cause the processor to replicate a multicast packet to produce first and second replicated multicast packets;

insert a non-ethernet address component into a header of the first and second replicated multicast packets;

select a first and second link of the logical channel, wherein the selecting comprises generating a first and second link identifier dependent upon a destination ethernet address of the first and second replicated multicast packets, respectively, and the non-ethernet address component of the first and second replicated multicast packets, respectively, and the first and second link identifiers identify the first and second links; and transmit the first and second replicated multicast packets over the first and second links of the logical channel.

56. The network device of claim 55, wherein the non-ethernet address component is dependent upon a network location of a final destination network device of the first and second replicated multicast packets.

57. The network device of claim 56, wherein the non-ethernet address component is a VLAN identifier.

58. The network device of claim 56, wherein the generating the link identifier comprises:

instructions that, upon execution by the processor, cause the processor to perform a hash function.

* * * * *